(12) United States Patent
Frank

(10) Patent No.: US 10,072,703 B2
(45) Date of Patent: Sep. 11, 2018

(54) BEARING ARRANGEMENT COMPRISING A CORROSION PROTECTION DEVICE

(71) Applicant: IMO Holding GmbH, Gremsdorf (DE)

(72) Inventor: Hubertus Frank, Höchstadt (DE)

(73) Assignee: IMO Holding GmbH, Gremsdorf (DE)

(*) Notice: Subject to any disclaimer, the term of this patent is extended or adjusted under 35 U.S.C. 154(b) by 151 days.

(21) Appl. No.: 14/653,387

(22) PCT Filed: Aug. 8, 2013

(86) PCT No.: PCT/EP2013/002374
§ 371 (c)(1),
(2) Date: Jun. 18, 2015

(87) PCT Pub. No.: WO2014/094924
PCT Pub. Date: Jun. 26, 2014

(65) Prior Publication Data
US 2015/0300404 A1    Oct. 22, 2015

(30) Foreign Application Priority Data

Dec. 19, 2012    (DE) .......................... 10 2012 024 823

(51) Int. Cl.
*F16C 19/04* (2006.01)
*F16C 35/04* (2006.01)
(Continued)

(52) U.S. Cl.
CPC .......... *F16C 19/04* (2013.01); *C23C 18/1621* (2013.01); *C23F 11/02* (2013.01);
(Continued)

(58) Field of Classification Search
CPC .......... F16C 19/04; F16C 19/16; F16C 19/52; F16C 35/04; F16C 35/042; F16C 2226/60;
(Continued)

(56) References Cited

U.S. PATENT DOCUMENTS 3,567,295 A * 3/1971 Wilkes ................ F16C 29/0619
384/44
4,710,142 A * 12/1987 Lovell .................. B63H 23/321
384/295
(Continued)

FOREIGN PATENT DOCUMENTS

DE    7004815    6/1970
DE    42 25 869    2/1994
(Continued)

OTHER PUBLICATIONS

Company website: Steffel—n.A. (—). "Classic' cathodic corrosion protection," URL: http://www.kks.de/de/loesungen/kathodischer-korrosionsschutz-kks/. Retrieved: Nov. 6, 2012.
(Continued)

*Primary Examiner* — Marcus Charles
(74) *Attorney, Agent, or Firm* — Pandiscio & Pandiscio

(57) ABSTRACT

The invention relates to a corrosion protection device for a bearing arrangement used or usable in machine and/or plant parts and a method for using such (a) corrosion protection device(s), wherein the bearing arrangement consists of at least one metallic material, e.g. 25CrMo4, 42CrMo4, 43CrMo4, 34CrNiMo6, C45, C45N, X20Cr13, GG-20, GGG-40, GS15, St 37 or the like and is used for the mutual relative movement of at least two bearing rings, wherein the bearing arrangement comprises a plurality of rolling elements and a plurality of through-bores and/or a plurality of blind bores, as well as a first screw-mounting surface for affixing a first mating structure and a second screw-mounting surface for affixing an opposite mating structure, characterized in that the corrosion protection device is integrated into at least one of the through-bores and/or blind bores or is or can be introduced in or at such bores.

7 Claims, 6 Drawing Sheets

(51) Int. Cl.
*C23C 16/00* (2006.01)
*C23F 11/02* (2006.01)
*C23C 18/16* (2006.01)
*F16C 19/52* (2006.01)
*F16C 19/16* (2006.01)

(52) U.S. Cl.
CPC .............. *F16C 19/52* (2013.01); *F16C 35/04* (2013.01); *F16C 35/042* (2013.01); *F16C 19/16* (2013.01); *F16C 2226/60* (2013.01); *F16C 2300/14* (2013.01); *F16C 2300/42* (2013.01)

(58) Field of Classification Search
CPC .............. F16C 2300/14; F16C 2300/42; F16C 33/565; F16C 33/6603; F16C 33/6696; F16C 2223/40; F16C 2223/60; F16C 2223/80; C23F 11/02; C23C 16/00; C23C 18/1621; C23C 15/00
USPC ......... 384/95, 510, 625, 910, 542; 29/898.1, 29/898.12, 898.13
See application file for complete search history.

(56) References Cited

U.S. PATENT DOCUMENTS

| | | | |
|---|---|---|---|
| 6,196,339 B1 * | 3/2001 | Portwood | E21B 10/25 175/227 |
| 7,150,852 B1 | 12/2006 | Beierle et al. | |
| 7,975,519 B1 | 7/2011 | Tooman | |
| 2005/0287316 A1 * | 12/2005 | Croce | B65D 81/24 428/34.1 |
| 2006/0000169 A1 | 1/2006 | Stephens | |
| 2012/0217086 A1 * | 8/2012 | Rombold | B62D 5/0403 180/446 |

FOREIGN PATENT DOCUMENTS

| | | | | |
|---|---|---|---|---|
| DE | 42 91 013 | | 2/1994 | |
| DE | 102010020020 A1 | * | 11/2011 | .............. F16C 19/52 |
| DE | 10 2011 120 775 | | 6/2012 | |
| EP | 1 925 860 | | 5/2008 | |
| GB | 666211 A | * | 2/1952 | .......... C10M 135/00 |
| JP | 03207802 A | * | 9/1991 | |
| JP | 06270219 A | * | 9/1994 | |
| SU | 587761 A1 | * | 1/1980 | .............. F16L 58/02 |
| WO | WO 2008125282 A1 | * | 10/2008 | |
| WO | WO 2013189535 A1 | * | 12/2013 | .............. F16C 33/60 |

OTHER PUBLICATIONS n.A. (-). Leitfaden zum Korrosionsschutz [Guideline on Corrosion Protection]—DIN EN ISO 14713, revised. URL: http://rss2.feuerverzinken.com/index.php?id=712. Retrieved: Nov. 6, 2012.

* cited by examiner

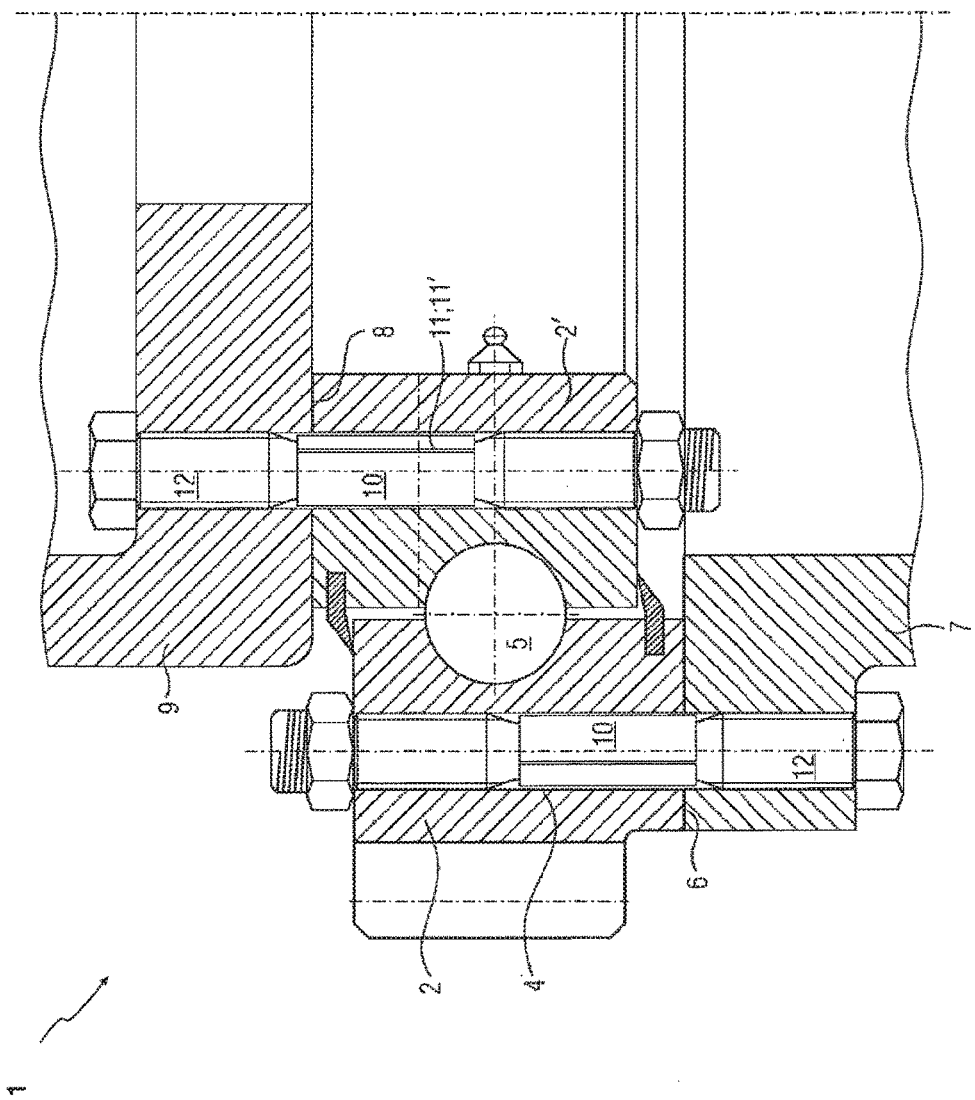

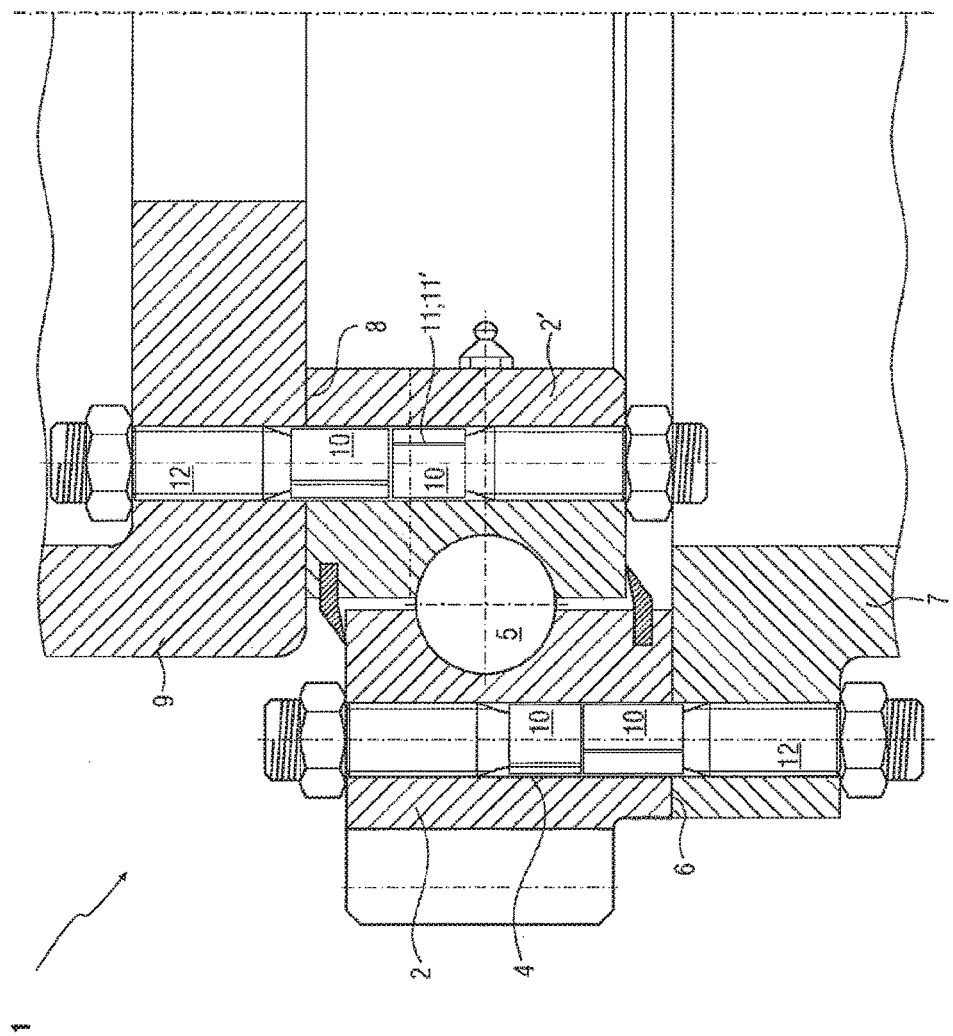

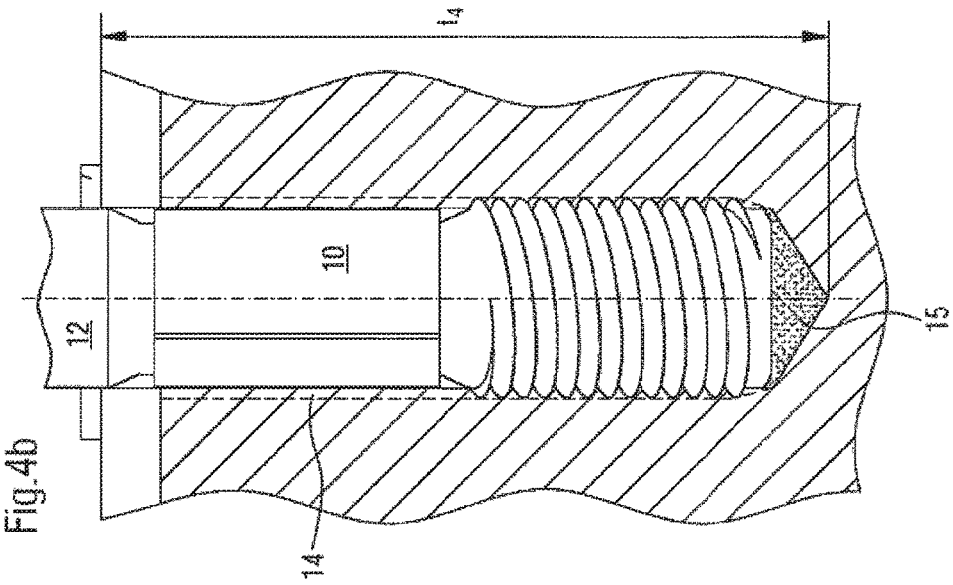
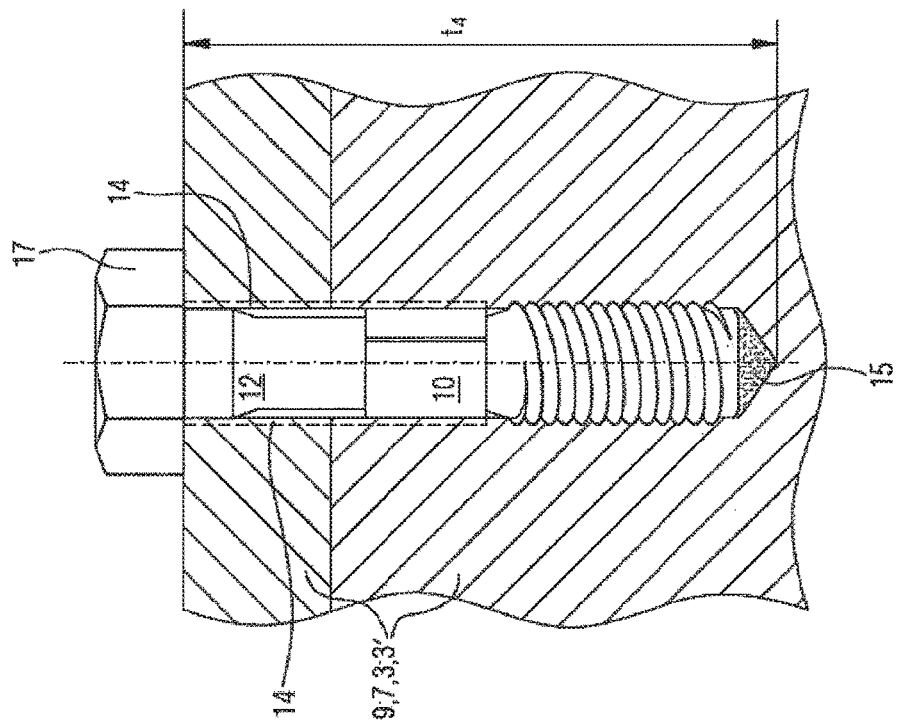

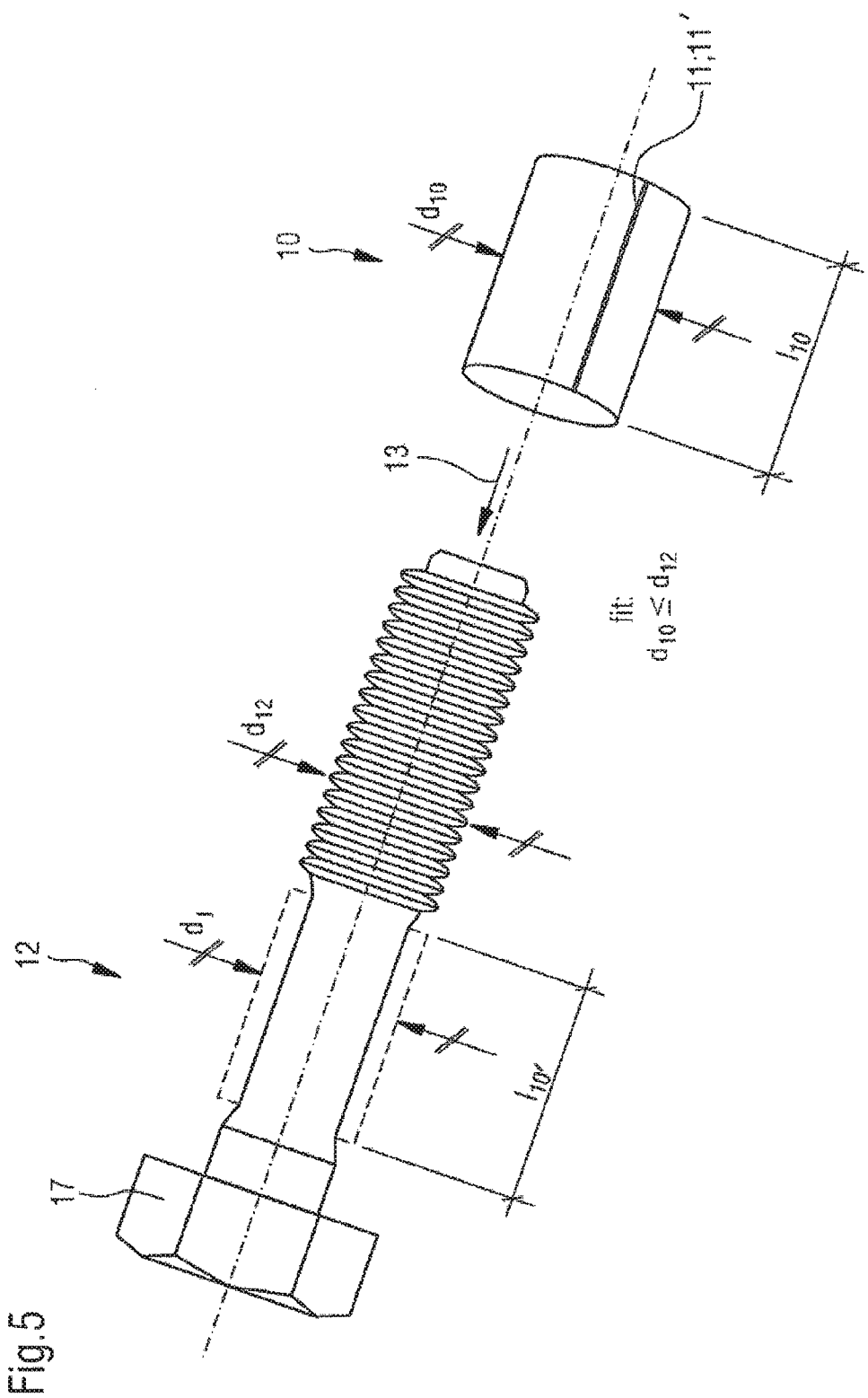

BEARING ARRANGEMENT COMPRISING A CORROSION PROTECTION DEVICE

REFERENCE TO PENDING PRIOR PATENT APPLICATIONS

This patent application claims benefit of International (PCT) Patent Application No. PCT/EP2013/002374, filed 8 Aug. 2013 by IMO Holding GmbH for BEARING ARRANGEMENT COMPRISING A CORROSION PROTECTION DEVICE, which claims benefit of German Patent Application No. DE 10 2012 024 823.7, filed 19 Dec. 2012, which patent applications are hereby incorporated herein by reference.

FIELD OF THE INVENTION

The invention concerns a device and a method for improving corrosion protection in bearing arrangements and a bearing arrangement equipped with such a corrosion protection device, for example consisting of 25CrMo4, 42CrMo4, 43CrMo4, 34CrNiMo6, C45, C45N, X20Cr13, GG-20, GGG-40, GS15, St 37 or a similar material. The corrosion protection device serves to improve corrosion protection in and at through-bores or blind bores in or at bearing arrangements such as rolling bearings and/or slewing rings. The invention is characterized in particular by the characterizing features of the claims and thus by the respective advantages cited.

BACKGROUND OF THE INVENTION

Prior Art and Current Problem Areas

Bearing arrangements such as rolling bearings, large rolling bearings and slewing rings, as well as torque bearings, which are used nowadays in aggressive gas/steam environments and/or under wet conditions, for example in offshore wind power installations or in underground tunneling machines or in hydroelectric plants or underwater power plants, have been shown by experience to be subject to higher corrosion than such rolling bearings, large rolling bearings, slewing rings or torque bearings that are continuously exposed to a dry gas environment.

Corrodible machine parts and plant parts of such bearing arrangements, for example corrodible bores or thrust surfaces of rolling bearings and large rolling bearings, corrodible raceway systems of slewing rings or torque bearings, etc., which cannot be identified in timely fashion because they are installed in a hard-to-access location and thus are not (cannot be) maintained or repaired, may fail before reaching their calculated service life. More severe consequential damage to additional or adjacent parts of the plant is not uncommon.

Corrosion in bores or thrust surfaces not infrequently causes such major defects that it becomes advisable or necessary to replace the entire bearing arrangement.

The corrosion-induced failure of machine and plant parts per se, particularly with respect to rolling bearings, large rolling bearings, slewing rings or torque bearings, is always disadvantageous in practice, since it is associated with repair and/or replacement work and thus may entail high costs. Basically, therefore, the current state of the art is to protect metal machine and plant parts against corrosion in a variety of ways.

In many cases, this corrosion protection takes the form of applying zinc coatings. Specialists have ultimately come to the consensus that the most durable corrosion protection measure is to apply a coating to the metallic machine and plant parts that are to be protected against corrosion. Thus, DIN ISO 14713 describes, for example, the process of hot dip galvanizing and the process of sherardizing to ensure the best possible corrosion protection of machine and plant parts against aggressive gas/steam environments and/or wet conditions. DIN EN ISO 12944 also addresses the corrosion protection of steel structures by means of coating systems [1].

That being said, it is not always advisable or expedient for practical/technical or economic reasons to apply a zinc coating to protect against corrosion, for example in the construction of special plants and/or pipelines or in connection with small-sized industrial products. In the former case, i.e., in pipeline construction, the skilled person resorts to, inter alia, cathodic corrosion protection to reduce the tendency to corrode. However, cathodic corrosion protection (CCP) [2] entails installation and maintenance costs for additionally required systems, i.e., it is at least necessary to install a protective current device and a deep anode. Apart from that, cathodic corrosion protection is usually provided only for buried or submerged metallic structures.

In the latter case (small-sized industrial products), by contrast, the skilled person often manages the problem with the aid of corrosion-inhibiting or corrosion-preventing sprays or lubricants. The use of so-called "volatile corrosion inhibitor (VCI)" films is another way to contain a prevailing tendency to corrode. In addition, palm-sized VCI dispensers or VCI emitters, which emit VCI molecules in the gas phase, are often used near electrotechnical installations that have been installed in aggressive gas/steam environments and/or wet conditions. A further development of such corrosion inhibitors known as "VCIs," so-called "vapor phase corrosion inhibitors (VPCI)" [3], are intended to form a monomolecular protective layer on nearby machine and plant parts, for example on small electronic components mounted on circuit boards.

A disadvantage associated with the use of such VCI or VPCI corrosion inhibitors as lubricants or sprays is that the skilled person can never be sure whether he has applied enough lubricant or spray to the location in question to bring about long-lasting corrosion protection. Some experts are of the opinion that such VCI/VPCI lubricants or VCI/VPCI sprays offer only temporary corrosion protection. Particularly when such VCI/VPCI lubricants or VCI/VPCI sprays are applied merely in and at through-bores or blind bores in or at bearing arrangements, one problem is that the lubricant or spray penetrating into the bore must be applied evenly over the entire surface of the borehole. This is difficult to achieve in practice, since a VCI/VPCI spray settles in the bore like a fog, and consequently only the surfaces directly confronting the cloud are reached by the agent. For example, the flanks of screw threads that are "shaded" from the fog are not wetted.

In addition, the sprayed-on or smeared-on substance evaporates after a relatively short period of time.

The use of metallic machine and plant parts made of stainless or semi-stainless steel is, of course, a valid method of inhibiting or preventing the negative effects of corrosion, but a major disadvantage here is the fact that stainless or semi-stainless steel is usually an expensive material, as is, for example, 42CrMo4 or C54N, and thus may occasion considerable additional costs.

SUMMARY OF THE INVENTION

Object of the Invention and Description of the Invention

The present invention has the technical object of eliminating the disadvantages produced by corrosion when bearing arrangements in or comprising metallic machine and plant parts are used in aggressive gas/steam environments and/or under wet conditions. The technical object is deemed to be solved by the creation of a bearing arrangement, for example consisting of a conventional bearing steel and/or structural steel or the like, which has less tendency to corrode in and at its through-bores or blind bores than the rest of the bearing arrangement and which offers longer-lasting, ideally much longer-lasting, corrosion protection than the sprays or lubricant coatings available heretofore.

This problem is solved, with respect to a bearing arrangement of the aforesaid kind for mutual relative movement of at least two bearing rings, primarily through the use of the present corrosion protection device and the following method for introducing an improved corrosion protection into the particular bearing arrangement, particularly into through-bores or blind bores of the particular bearing arrangement.

The invention accordingly provides a corrosion protection device for a bearing arrangement used or usable in machine and/or plant parts, said bearing arrangement consisting of at least one metallic material and being used for the relative movement of at least two bearing rings.

The material of at least one ring of the bearing arrangement is preferably formed, in this case, from 25CrMo4, 42CrMo4, 43CrMo4, 34CrNiMo6, C45, C45N, X20Cr13, GG-20, GGG-40, GS15, St 37 or similar material metallic materials. Such bearing arrangement comprises or contains a plurality of rolling elements and a plurality of through-bores and/or blind bores, as well as a first screw-mounting surface for affixing a mating structure and a second screw-mounting surface for affixing an opposite mating structure. Particularly characteristic of the invention is the fact that the corrosion protection device according to the invention is integrated into through-bores and/or blind bores or is or can be introduced at such bores.

In a further embodiment of the invention, sliding elements can be used instead of rolling elements. This situation arises particularly in plain bearing applications. Such applications also sometimes require the increased corrosion protection afforded by the aforesaid invention.

In a first realization according to the invention, the teaching of the inventive corrosion protection device includes one or more sleeves, each optionally having along its longitudinal direction an introduced clamping gap and/or one or more thus-introduced recesses, in an approximately similar manner to a conventional clamping sleeve as known from DIN 1481. This at least one sleeve is not made of spring steel, however.

Such sleeves in the sense of the invention preferably consist of non-metallic material, for example of synthetic material or film or cardboard or even of "hard" paper or of textile material such as felt or fabric. Said non-metallic sleeve material can be moistened, impregnated or filled with a corrosion protection agent, for example comprising corrosion inhibitors such as VCI or VPCI, alternatively with a grease-based corrosion-inhibiting or corrosion-preventing agent, such as terminal grease.

The aforesaid corrosion protection agent is also preferably based on the basis of a mixture, of which a component of highly refined carbohydrates offer. It is, further, within the technical teaching of the invention that the at least one sleeve is implemented as open-centered. Such a sleeve can serve as a carrier material for corrosion inhibitors, particularly as a VCI dispenser or VPCI emitter that emits VCI molecules or VPCI molecules in the gas phase.

These gas-phase molecules strike immediately-adjacent parts of the bearing arrangement, thus resulting in the formation of a corrosion protection layer.

Alternatively, the at least one sleeve can be implemented as open-centered and can be impregnated or merely moistened with terminal grease. So that said terminal grease remains in the bearing for an extended period of time, it has proven particularly advantageous if a special shape of such a bearing includes separate undercuts or chambers that are or at least can be filled with terminal grease.

This measure ensures that the corrosion-confining effect of the invention is maintained for the longest possible period of time.

The special advantage of the aforesaid corrosion protection device comprising at least one sleeve comes to fruition if preferably at least one of the screws (for example each in the form of a stretch bolt) or even at least one of the rivets is provided with at least one respective such sleeve.

That sleeve then surrounds the screw or rivet annularly in the longitudinal direction, in approximately similar fashion to the aforesaid principle of the clamping sleeve.

It is particularly advantageous if this sleeve surrounds the screw or rivet, optionally even under mechanical tension, since the sleeve can be largely prevented from slipping axially out of position on the screw or rivet in this way.

In a manner known from bearing technology, each screw or rivet is introduced into a respective through-bore or blind bore in the bearing arrangement while the respective associated sleeve meanwhile surrounds the screw or rivet, if appropriate under mechanical tension, and thus is also introduced into the borehole, i.e., into the through-bore or blind bore.

The present corrosion protection device lends itself, for example, to use with stretch bolts or expansion bolts in accordance with DIN 2510. Expansion bolts are particularly useful for structures that are exposed to stress due to variable operating forces and temperatures, such as instruments, pipelines, plant turbines, oscillating plant parts, or the like.

It has, in fact, been found that the performance of such an expansion bolt or stretch bolt is optimal particularly when the following materials are used: 12 Ni 19, X 10 CrNiTi 189, X 10 CrNiMoTi 1810, Ck 35, 24 CrMo 5, 21 CrMoV 57, 40 CrMoV 47, 12 Ni 19, X 10 CrNiTi 189, X 10 CrNiMoTi 1810, Ck 35, 24 CrMo 5, 21 CrMoV 57, 40 CrMoV 47, G 5.6, G 8.8, G 10.9 and/or G 12.9.

The aforesaid screws, stretch bolts or rivet(s) are normally used to affix a first screw-mounting surface to a first mating structure, or alternatively to affix a second screw-mounting surface to a second mating structure.

All designs and types of torque bearings, (large) rolling bearings and slewing rings may be contemplated for use as the bearing arrangement in the sense of the present teaching, for example, but not limited to, single-row or multi-row large rolling bearings, roller slewing rings, ball bearings, four-point bearings, combination bearings, needle bearings, bearings and slewing rings with conical or barrel-shaped rolling elements, crossed roller bearings, wire roller bearings, et cetera.

In an alternative realization form of the corrosion protection device, the bearing arrangement equipped therewith is developed further such that the corrosion protection effect can be further increased in an extremely advantageous manner, cumulatively to the aforesaid introduction of a sleeve, by providing in the borehole a region of altered microstructure, particularly altered surface microstructure in a finely crystalline realization. The depth of this region of altered material microstructure can be only a few fractions of a millimeter, although it can also be up to a few millimeters thick. This altered microstructure region of the bearing material becomes advantageous in the sense of the invention if it has a depth or thickness of between 0.05 mm and 5.00 mm.

Such a range of between 0.50 mm and 2.00 mm has proven particularly advantageous in accomplishing the corrosion protection task of the present invention.

It has further proven to be ideal for the purposes of the invention if, in the borehole, the aforesaid base material of the bearing arrangement (for example 25CrMo4, 42CrMo4, 43CrMo4, 34CrNiMo6, C45, C45N, X20Cr13, GG-20, GGG-40, GS15, St 37, or the like) presents a continuous microstructural transition to said microstructure region of the bearing material that has a preferably more finely crystalline microstructure than said base material. In practice, this altered microstructure region can be introduced into the circular circumferential surface of a given borehole by grinding or rolling or other types of cold working.

Such an altered microstructure region in the borehole of the bearing material has, according to the invention, higher compressive stress energies than the base material of the bearing arrangement. The method for introducing corrosion protection in the sense of the altered microstructure region is to be carried out according to the invention as described below:

This aforesaid altered microstructure region is applied, for example, by or via a pressure-blasting process. In such a process, small and hard, for example spherical, bodies are fired into the borehole under very high pressure. When the bodies strike the surface of the borehole, the kinetic energy of these small and hard bodies is converted in significantly high proportions to plastic deformation energy, by means of which the microstructure existing in the borehole before this process step is work-hardened, for example cold-worked. Thus, surface densification is brought about preferably by a shot blasting process and the corrosion protection is thereby increased.

Zinc-containing blasting agents can also advantageously be used in such a pressure blasting process. The zinc in such a blasting agent brings the significant improvement that the surface being blasted, i.e., usually the surface in the borehole (blind bore or through-bore) is coated with zinc, thus making for additional corrosion protection.

A cladding effect also occurs in said borehole, since the material of the bearing arrangement is covered with a zinc coating.

In a further alternative realization form of the corrosion protection device, the bearing arrangement equipped therewith is developed further in that a corrosion-inhibiting or corrosion-preventing powder, for example a powder that emits VCI molecules or VPCI molecules in the gas phase, is or will be introduced into at least one borehole of the bearing rings.

BRIEF DESCRIPTION OF THE DRAWINGS

Further features, characteristics, advantages and effects based on the invention will emerge from the following description of some preferred embodiments of the invention and by reference to the drawings. Therein:

FIG. 1 shows a bearing arrangement of the aforesaid kind, in the realization of a rolling bearing with spherical rolling elements (5), one sleeve (10) per screw (12) being used to furnish corrosion protection.

FIG. 1a shows a bearing arrangement of the aforesaid kind as depicted in FIG. 1, in which two sleeves (10) per screw (12) are used. Stretch bolts (12) with no screw head (17) are used in the case shown.

FIG. 4a shows a detail of a bearing arrangement of the aforesaid kind similar to that of FIG. 3 in which the screw (12) is provided with a respective sleeve (10) and terminates in a blind bore (4'). To improve the corrosion protection in the borehole (4'), corrosion-inhibiting or corrosion-preventing powder (15) is added to the borehole (4').

FIG. 4b shows a bearing arrangement of the aforesaid kind similar to that of FIG. 4a as a detail, indicating the region of the altered, for example finely crystalline, microstructure (14).

FIG. 5 shows a method for mounting a sleeve 10 on a stretch bolt 12.

DETAILED DESCRIPTION OF THE PREFERRED EMBODIMENT

As can be seen by way of example in FIG. 4 and FIG. 4a, the borehole 4; 4' has a given bore depth $t_4$. The region of altered microstructure 14 can extend to the bottom of the borehole 4; 4' (cf. FIG. 4b), or, alternatively, can be present only along a portion of the bore depth $t_4$ (cf. FIG. 4a). FIG. 4 and FIG. 4a also exemplarily illustrate the corrosion-preventing or corrosion-inhibiting powder 15, which is placed, for example, at the bottom of a blind bore 4'. By virtue of the powder 15 being placed at this location, said powder 15 can also function as a VCI dispenser or VPCI emitter, emitting VCI molecules or VPCI molecules in the gas phase.

Figure 2:
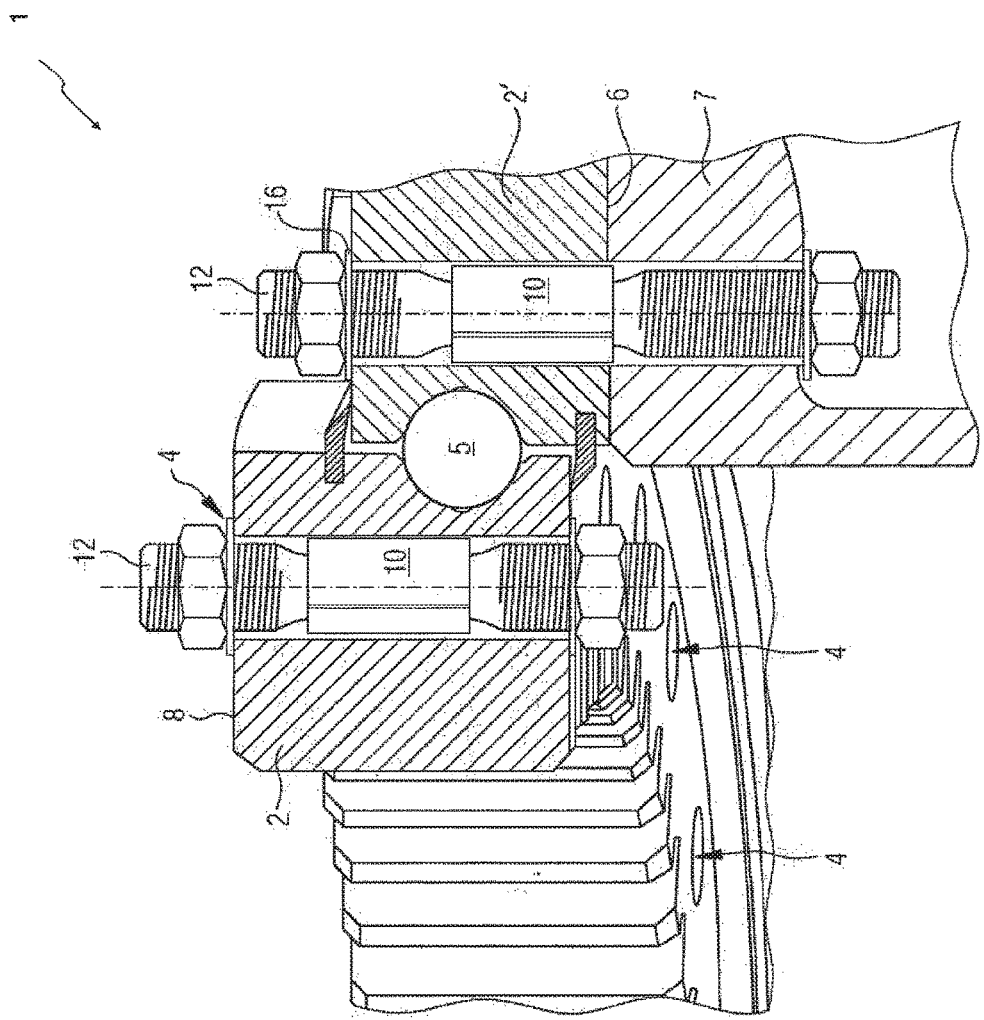
FIG. 2 shows another bearing arrangement of the aforesaid kind as depicted in FIG. 1, wherein one of the bearing rings is toothed, while the opposite bearing ring (2') is screwed coronally to a mating structure (7), each screw (12) being inserted into a respective through-bore (4).

FIG. 1 and FIG. 2 each show by way of example the corrosion protection device 1 according to the invention for a bearing arrangement 2; 2' installed or installable in machine and/or plant parts, wherein the bearing arrangement 2; 2' consists of at least one metallic material and is used for the mutual relative movement of the two bearing rings 2; 2', wherein the bearing arrangement comprises a plurality of spherical rolling elements 5 and a plurality of through-bores 4, as well as a first screw-mounting surface 6 for affixing a first mating structure 7 and a second screw-mounting surface 8 for affixing an opposite mating structure 9. The corrosion protection device 1 is integrated in the form of a respective sleeve 10 into each through-bore 4, specifically such that a respective screw 12 is surrounded by the sleeve.

Each sleeve 10 thus remains in place in the bore 4, particularly in a captive manner. FIG. 1a shows a similar realization form, but with a plurality of sleeves 10 per bore 4 or screw 12. In practice, it has proven useful as a basic principle to use washers 16 at the boreholes 4.

In connection with the present invention 1, such washers 16 perform an additional securing function, such that due to the presence of one washer 16 per borehole 4 and screw 12, the sleeves 10 introduced into or present in the bore 4 cannot drop out of the bore 4. The borehole diameter of the washer 16 in this case must be smaller than the open-center diameter of the sleeve 10.

Figure 3:
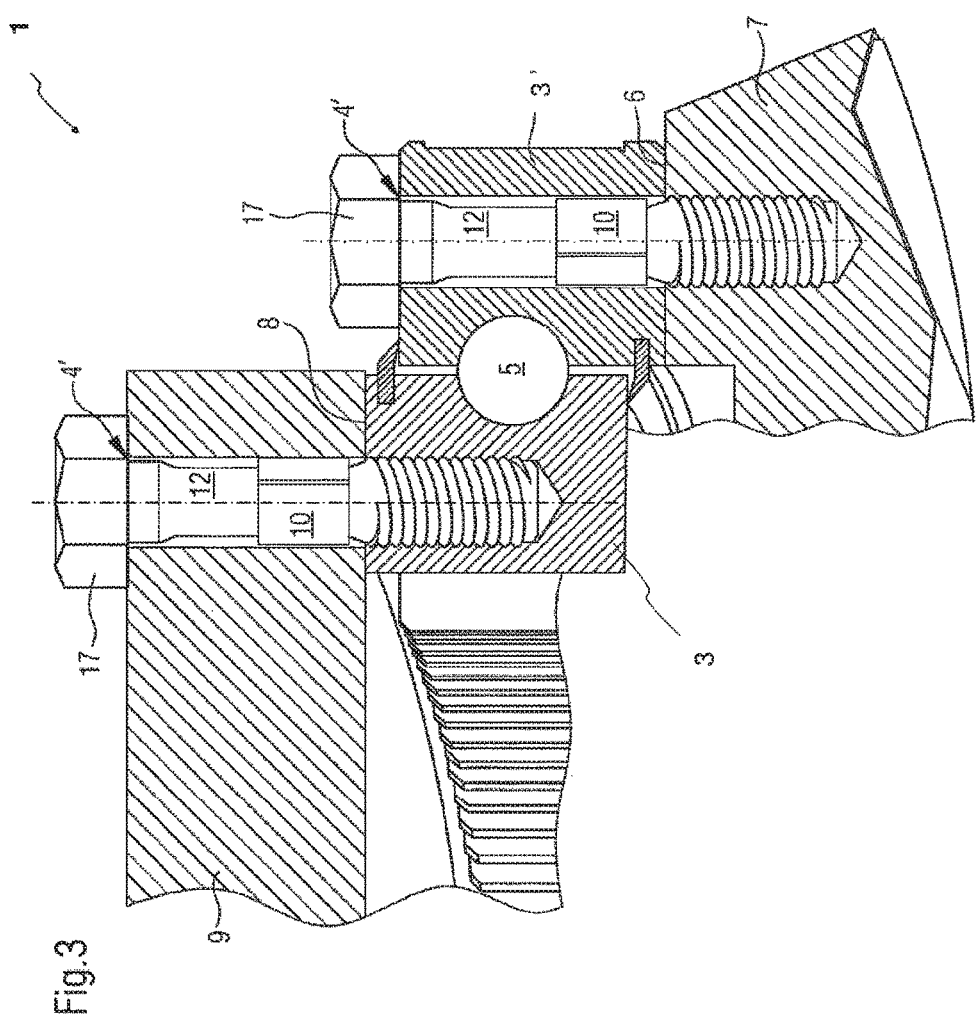
FIG. 3 shows a bearing arrangement of the aforesaid kind similar to that of FIG. 2, in which the screws (12) terminate in blind bores (4').

FIG. 3 shows by way of example the corrosion protection device 1 according to the invention for a bearing arrangement 3; 3' used or usable in machine and/or plant parts, wherein the bearing arrangement 3; 3' consists of at least one metallic material and is used for the mutual relative movement of two bearing rings 3; 3', wherein at least one of said bearing rings optionally comprises a toothing, wherein the bearing arrangement comprises a plurality of spherical rolling elements 5 and a plurality of blind bores 4', as well as a first screw-mounting surface 6 for affixing a first mating structure 7 and a second screw-mounting surface 8 for affixing an opposite mating structure 9. The corrosion protection device 1 is integrated in the form of a respective sleeve 10 into each blind bore 4', specifically such that a respective screw 12 is surrounded by the sleeve.

Finally, FIG. 5 exemplarily describes the method for mounting a sleeve 10 on a stretch bolt 12. The diameter $d_{10}$ of the sleeve 10 is slid over the diameter $d_{12}$ of a stretch bolt 12—in a similar manner to a DIN-compliant clamping sleeve—optionally under mechanical stress. Mechanical stress occurs when $d_{10}$ is less than or equal to $d_{12}$. Advantageously, the axial length $l_{10}$ of the sleeve 10 in the longitudinal direction 13 is nearly or exactly identical to the length $l_{10}'$ of the tapered region $d_j$ of said stretch bolt 12. A screw head 17, if present, prevents the sleeve 10 from also slipping out of the borehole 4; 4' during the operation of the bearing arrangement in a machine or system.

FIG. 5 clearly shows the region of the clamping gap 11 or recess 11' in the sleeve, which is the only element permitting a mechanical broadening of the diameter $d_{10}$ of the sleeve 10. In particular, the clamping gap 11 or recess 11' in the sleeve permits a mechanical broadening of the diameter $d_{10}$ to at least the value of the diameter $d_{12}$ of the screw 12.

LIST OF REFERENCE CHARACTERS

1 Corrosion protection device
2 Bearing arrangement; bearing ring
3 Bearing arrangement; bearing ring
4 Through-bore
5 Rolling element
6 Screw-mounting surface
7 Mating structure
8 Screw-mounting surface
9 Mating structure
10 Sleeve
11 Clamping gap
12 Screw (e.g. stretch bolt)
13 Longitudinal direction
14 Microstructure region (with altered microstructure)
15 Powder (corrosion-inhibition or corrosion-preventing)
16 Washer
17 Screw head
$t_4$ Bore depth
$l_{10}$ Sleeve length
$l_{10'}$ Length of tapered region
$d_{10}$ Sleeve diameter
$d_{12}$ Diameter (of screw or rivet)
$d_j$ Diameter, tapered
2' Bearing arrangement; bearing ring
3' Bearing arrangement; bearing ring
4' Blind bore
11' Recess
12' Rivet

NON-PATENT SOURCES CITED

[1] n.A. (--). *Leitfaden zum Korrosionsschutz* [*Guideline on Corrosion Protection*]—*DIN EN ISO* 14713, revised. URL: http://rss2.feuerverzinken.com/index.php?id=712. Retrieved: Nov. 6, 2012.

[2] Company website: Steffel—n.A. (--). "'Classic' cathodic corrosion protection." URL: http://www.kks.de/de/loesungen/kathodischer-korrosionschutz-kks/. Retrieved: Nov. 6, 2012.

[3] Company website: Corpac Deutschland GmbH & Co. KG•Robert-Bosch-Str. 4•71720 Oberstenfeld—n.A. (--). "What are VCI/VpCI." URL: http://www.corpac.de/index.php/vci_vcpi.html. Retrieved: Nov. 6, 2012.

The invention claimed is:

1. A method for improving corrosion protection in a bearing arrangement, namely a rolling bearing, a large rolling bearing, a torque bearing or a slewing ring, the bearing arrangement comprising a first and a second bearing ring each consisting of at least one metallic material, wherein the first bearing ring comprises a first screw-mounting surface for affixing to a first mating structure, while the second bearing ring comprises a second screw-mounting surface for affixing to a second mating structure, wherein each of the first and second screw-mounting surfaces comprises boreholes for receiving a respective screw for a coronally screwing of the bearing arrangement to the first and second mating structure, characterized in that before the bearing arrangement is installed between a first and a second mating structure, at least one screwing borehole of at least one of the bearing rings is provided with at least one sleeve made from non-metallic material and moistened or impregnated or even filled with a corrosion protection agent, said sleeve being impregnated with terminal grease or moistened with terminal grease, or serving as a carrier material for corrosion inhibitors.

2. A method according to claim 1, characterized in that the sleeve serves as a VCI dispenser or VPCI emitter that emits VCI molecules or VPCI molecules in a gas phase.

3. A method according to claim 1, characterized in that the sleeve is provided with a clamping gap extending along the longitudinal direction of the sleeve.

4. A method according to claim 3, characterized in that the sleeve is provided with one or more recesses.

5. A method according to claim 1, characterized in that a powder that emits VCI molecules or VPCI molecules in a gas phase is placed in at least one screwing borehole of the bearing rings.

6. A method for improving corrosion protection in a bearing arrangement, namely a rolling bearing, a large rolling bearing, a torque bearing or a slewing ring, the bearing arrangement comprising a first and a second bearing ring each consisting of at least one metallic material, wherein the first bearing ring comprises a first screw-mounting surface for affixing to a first mating structure, while the second bearing ring comprises a second screw-mounting surface for affixing to a second mating structure, wherein each of the first and second screw-mounting surfaces comprises boreholes for receiving a respective screw for a coronally screwing of the bearing arrangement to the first and second mating structure, characterized in that before the bearing arrangement is installed between a first and a second mating structure, at least one of the bearing rings is impregnated with terminal grease or moistened with terminal grease at or in its at least one borehole.

7. A method for improving corrosion protection in a bearing arrangement, namely a rolling bearing, a large rolling bearing, a torque bearing or a slewing ring, the bearing arrangement comprising a first and a second bearing ring each consisting of at least one metallic material, wherein the first bearing ring comprises a first screw-mounting surface for affixing to a first mating structure, while the second bearing ring comprises a second screw-mounting surface for affixing to a second mating structure, wherein each of the first and second screw-mounting surfaces comprises boreholes for receiving a respective screw for a coronally screwing of the bearing arrangement to the first and second mating structure, characterized in that corrosion-inhibiting or corrosion-preventing powder is placed in at least one screwing borehole of the bearing rings.

\* \* \* \* \*